(12) United States Patent
Hoenack

(10) Patent No.: US 6,394,528 B2
(45) Date of Patent: May 28, 2002

(54) BALLISTICALLY DEPLOYED VEHICLE AND UTILITY COVERS

(76) Inventor: Jeremy Hoenack, 2815 W. Burbank Blvd., Burbank, CA (US) 91505

( * ) Notice: Subject to any disclaimer, the term of this patent is extended or adjusted under 35 U.S.C. 154(b) by 0 days.

(21) Appl. No.: 09/903,933

(22) Filed: Jul. 12, 2001

Related U.S. Application Data

(63) Continuation-in-part of application No. 09/405,776, filed on Sep. 27, 1999.

(51) Int. Cl.$^7$ ................................................. B60J 11/00
(52) U.S. Cl. .................... 296/136; 150/160; 160/370.21
(58) Field of Search ........................... 296/136; 150/166, 150/168; 160/370.21, DIG. 2; 52/3, 4

(56) References Cited

U.S. PATENT DOCUMENTS

| | | |
|---|---|---|
| 3,338,293 A | 8/1967 | Hohmann |
| 3,862,876 A | 1/1975 | Graves |
| 3,960,193 A | 6/1976 | Davis |
| 4,122,637 A | 10/1978 | Runge et al. |
| 4,634,618 A | 1/1987 | Greer et al. |
| 4,635,993 A | 1/1987 | Hooper et al. |
| 4,799,728 A | 1/1989 | Akers et al. |
| 4,821,785 A | 4/1989 | Rolan |
| 4,842,324 A | 6/1989 | Carden |
| 4,850,635 A | 7/1989 | Lindell |
| 4,944,340 A | 7/1990 | Tortorich |
| 4,972,892 A | 11/1990 | Yeh |
| 4,979,339 A | 12/1990 | Jones et al. |
| 5,029,933 A | 7/1991 | Gillem |
| 5,097,638 A | 3/1992 | Jones |
| 5,123,468 A | 6/1992 | Mater, Jr. |
| 5,188,417 A | 2/1993 | Curchod |
| 5,240,305 A | 8/1993 | Trethewey |
| 5,242,206 A | 9/1993 | Heck |
| 5,244,245 A | 9/1993 | Kashino |
| 5,328,230 A | 7/1994 | Curchod |
| 5,364,156 A | 11/1994 | Zerow |
| 5,401,074 A | 3/1995 | Timerman |
| 5,476,127 A | 12/1995 | Fournier |
| 5,490,707 A | 2/1996 | De La Cruz |
| 5,597,196 A | 1/1997 | Gibbs |
| 5,597,197 A | 1/1997 | Mowar et al. |
| 5,638,642 A | 6/1997 | Nemec |
| 5,653,492 A | 8/1997 | Mills |
| 5,845,958 A | 12/1998 | Rudys et al. |

Primary Examiner—Stephen T. Gordon
Assistant Examiner—Gregory Blackenship
(74) Attorney, Agent, or Firm—Sanford Astor

(57) ABSTRACT

A ballistically deployable cover for an object, such as vehicle, comprising a light weight fabric, having a plurality of weights affixed thereto, generally evenly spaced around the perimeter of the fabric, each of said weights comprising an outer pouch, a layer of padding within said pouch and ballast material within said padding.

18 Claims, 5 Drawing Sheets

BALLISTICALLY DEPLOYED VEHICLE AND UTILITY COVERS

This application is a continuation-in-part of my parent application No. 09/405,776 filed Sep. 27, 1999.

BACKGROUND

1. Field of Invention

This invention relates to vehicle and utility covers, specifically, an improved design that can be deployed and stored in seconds, and is, therefore, truly practical for everyday use.

2. Description of Prior Art

Many varied designs of car covers exist, offering protection from dirt, heat, ultraviolet damage, and prying eyes. A car cover is essential to protect against the intense heat created by the greenhouse effect. This heat can melt plastics such as CDs, laser discs, and cassettes, and can dry out, and crack upholstery, and dashboards. Air-conditioning is ineffective with this heat for the first several minutes. In colder climates a cover can prevent ice from adhering to windows.

Existing designs have numerous features such as suction cups, hook and loop type fasteners, straps, locking devices, vents, flaps, weighted flaps or hollow sleeves, zippers, pockets, mounting clips, drawstrings, hooks, stowage bags, and various methods of deployment, including rollers. These features are presumably intended to make the car cover more convenient or useful. However, existing covers are cumbersome and take too much time to deploy. They are rarely used except for long-term storage.

Very few drivers bother to cover their car even though they desire the advantages offered by a car cover. Many drivers have a cover in their trunk which they purchased when their car was new, but they do not use them. The problem is the difficulty and time it takes to deploy and secure the cover after parking, and then the time and inconvenience to remove and stow the cover prior to departure. Most drivers would rather suffer in the heat for a ten-minute drive and ignore the damage to their car and its contents. They do not want to spend the time it takes to uncover, then recover at the restaurant, then uncover and recover again back at work. None of the existing designs are convenient enough for the average person to keep their car covered during a normal day.

U.S. Pat. No. 4,842,324 (Carden, 1989) discloses a cover for the cab portion with tubular members along the perimeter that are held in place with, wipers, windows and the trunk lid, to provide security and a tight fit. Such a cover would require numerous sizes to fit properly, and is time consuming to deploy. To secure the tubular member in a window requires reentering the vehicle and then securing the flap that allows the re-entry. Tension from wind blowing the cover could damage the wiper arms.

U.S. Pat. No. 5,490,707 (De La Cruz, 1996) discloses an automobile sunshield that has small apertures to release wind pressure from inside the sunshield. The sunshield is fastened on to the automobile with suction cups. A security band and lock secure the sunshield to the automobile. This cover must be oriented properly and is difficult to deploy. A lock must be fussed with to secure it.

U.S. Pat. No. 5,364,156 (Zerow, 1994) is constructed to fit a standard auto or truck. It features a top, a back, a front, and two sides attached to each other by means of an elasticized accordion connector at each vertical edge. The lower horizontal edges of the front, back, and side flaps are hollowed out and have a cylindrical compartment. This cylindrical compartment may be filled with gravel or such, thus providing weight to the:cover. With the cylindrical compartment filled with gravel or sand, it would be difficult to maneuver this cover over the vehicle or fold it for stowage.

Most of the above mentioned covers are nearly impossible for one person to deploy quickly, especially if the person is not tall. Unless the cover is folded and stowed very carefully, it is difficult to properly orient the cover prior to deployment. This is time consuming and inconvenient.

Several types of car covers have been proposed to simplify deployment. For example, U.S. Pat. Nos. 5,029,933 (Gillem, 1991), 5,328,230 (Churchod, 1994) and 5,597,197 (Mower et. al., 1997), all define trunk-mounted means of deployment. Each requires that the cover be threaded through the opening, which is created between the raised edge of the trunk lid and the rear windshield prior to each deployment and pulled back through the same opening for stowage. This action is awkward at best and largely negates the benefit of having one end permanently attached to the vehicle. Each can be easily tangled. Stowage is more awkward because the attachment to the trunk lid impedes pulling or pushing the cover back into the trunk. The attachment also makes it nearly impossible to fold the cover while stowed. Curchod and Mower provide pouches but stuffing the cover into the pouch requires even more time. Each occupies considerable trunk space. Neither would be appropriate for a hatchback, certain sports utility vehicles or a pick-up truck.

U.S. Pat. No. 5,597,196 (Gibbs, 1997) is an example of a costly spring-biased roller deployment system that is mounted inside the trunk, about the axis of the axle. Attached to the roller at one end and the axle at another end are a spring means. The purpose is for the operator to pull the cover from the roller and attach it to the end of the auto opposite from the trunk and secure it to the bumper. The installation and labor for this system is unduly complicated and expensive. The utility of the trunk is significantly reduced because the roller spans the width of the trunk. While the trunk mount designs attempt to address the problem of deployment, all are unduly complicated.

U.S. Pat. No. 5,123,468 (Mater, Jr., 1992) provides a windshield only cover that has just one pair of handles (20) which are used to engage the door and door frame so as not to pull through between them when the door is closed. Mater's handles are made of ABS plastic, which is very hard and not very energy absorbing. No one would want to throw hard ABS plastic against an expensive car, unless he wished to do it harm. Mater's handles cannot be easily stacked together because of their shape. Even if held together, they would not form a spindle that would be easy around which to wind a cover.

De La Cruz (5,490,707) provides a cover that covers the cab portion of a vehicle, with a plurality of apertures to release wind pressure, suction cups for fastening the cover to the vehicle and a security band, sleeve, and lock to secure the cover to the rear view mirrors. De La Cruz teaches the use of vent holes (116, 118, 122, 124, 126, 128, 132, 134) to help prevent the cover (100) from coming out of contact with the car. De La Cruz's vent holes are fixed, open apertures, allowing UV and the elements through. De La Cruz does not disclose any type of weights, nor does he describe any means of deployment.

There is no prior art car cover that can be thrown over a vehicle.

U.S. Pat. No. 5,242,206 (Heck, 1993) provides an inflatable hail blanket, similar to an air mattress that cushions the impact of hail. Heck teaches that some undescribed weights can be attached to the cover, where his straps are located, as an alternate means of securement, as does U.S. Pat. No. 4,979,339 (Jones et al., 1990). Neither anticipates said weights facilitating deployment, nor would either's weights be suitable for deployment of a cover.

U.S. Pat. No. 3,960,193 (Davis, 1976) provides a rectangular weighted picnic table cloth with small weights in each corner to resist motion from wind or a person moving along a side of the table. While Davis teaches the use of weights in conjunction with a tablecloth, Davis does not suggest ballistic deployment since Davis teaches that the table cloth is draped over the tabletop.

SUMMARY OF PRIOR ART VEHICLE COVERS

All of the prior art vehicle covers are inconsistent with the basic function of the automobile, which, by itself, is a model of convenience that drivers have come to expect. One can unlock the door, climb in, start the engine, and drive away. all in a matter of seconds. In even less time, one can park, exit, and lock it. By contrast, all prior-art vehicle covers are inconvenient. They take much longer to deploy and stow than arriving or departing in a vehicle, and they all require significant stature, strength and dexterity on the part of the driver, and, perhaps, even a helper. This inconvenience is unacceptable to nearly all drivers. This is why the prior art vehicle covers are almost never used by the general public, except for long-term storage.

OBJECTS AND ADVANTAGES

It is an object of the present invention to provide an easy to manage cover with a method of deployment so quick and easy, that it is practical to cover and protect a vehicle each time it is parked. Further objects and advantages are: to provide a quick and easy method to secure said cover, to provide a quick and easy method to remove said cover, and, to provide a quick and easy method to store said cover.

Additional objects and advantages are:

(1) to provide said cover with light-weight, highly UV and AIR reflective, water and ice resistant fabric and lightweight; to provide easily handled weights that are rigid enough that a rapid thrust imparts adequate energy to them, so that they are propelled ballistically, instantly carrying the cover over many types of vehicles, such that even a short person can quickly cover a tall vehicle such as a motor-home;

(2) to provide energy absorbing qualities to said weights so that they will not damage the vehicle when they are deployed;

(3) to provide said weights with a special padding that minimizes impact noise so that they are perceived to be safe;

(4) to provide said weights with added friction to help anchor the cover;

(5) to provide said weights with a shape that makes it possible to stack all four of them together and hold them with one hand, forming a spindle around which to easily wind the cover, for storage, keeping the weights organized for the next deployment;

(6) to provide a means to remove said weights so the cover can be machine-washed;

(7) to provide a design that makes it possible to lock one or more weights inside the doors of the vehicle, to protect the cover from theft, and weights that will not be damaged, or damage the vehicle, if accidentally slammed in the door frame;

(8) to provide color-coded hand and jet symbols on the weights, making it obvious which are held, which are thrown and which are held in the left and right hands;

(9) to provide weights that can act like an invisible helper on the other side of the car to pull the cover into perfect position;

(10) to provide a storage strap that easily secures the cover when it is coiled;

(11) to provide (a) additional means of securing the cover with suction cups, hook and loop straps, and grommets, and, (b) automatic self-closing vents to allow trapped air to escape, especially when the cover is coiled for storage;

(12) to provide heavy-duty weights for very large covers.

Still further objects and advantages will become apparent from a consideration of the ensuing description and accompanying drawings.

DETAILED DESCRIPTION OF THE INVENTION

Figure 1:
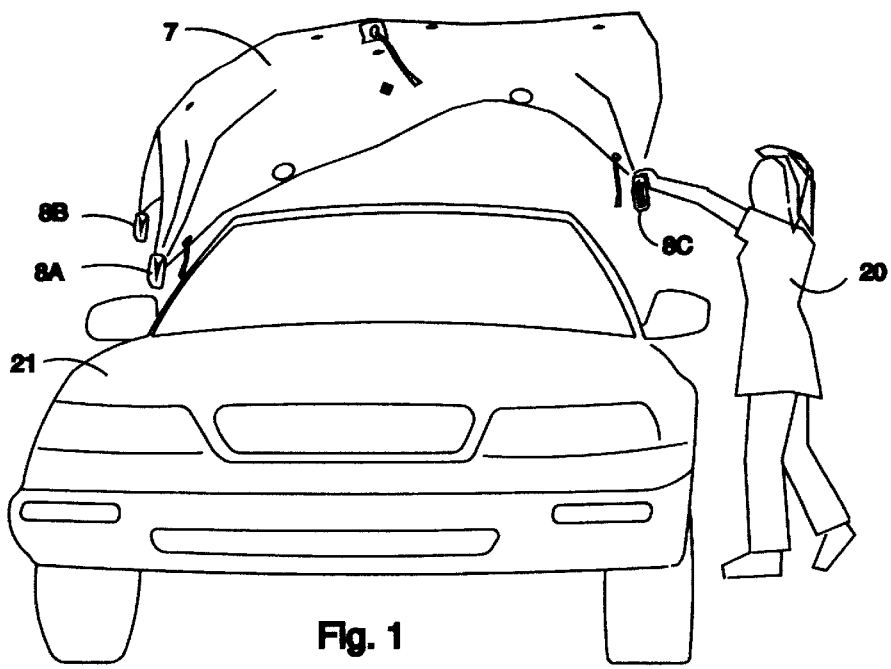
FIG. 1 is a front view showing the cover in the action of being deployed.
Figure 2:
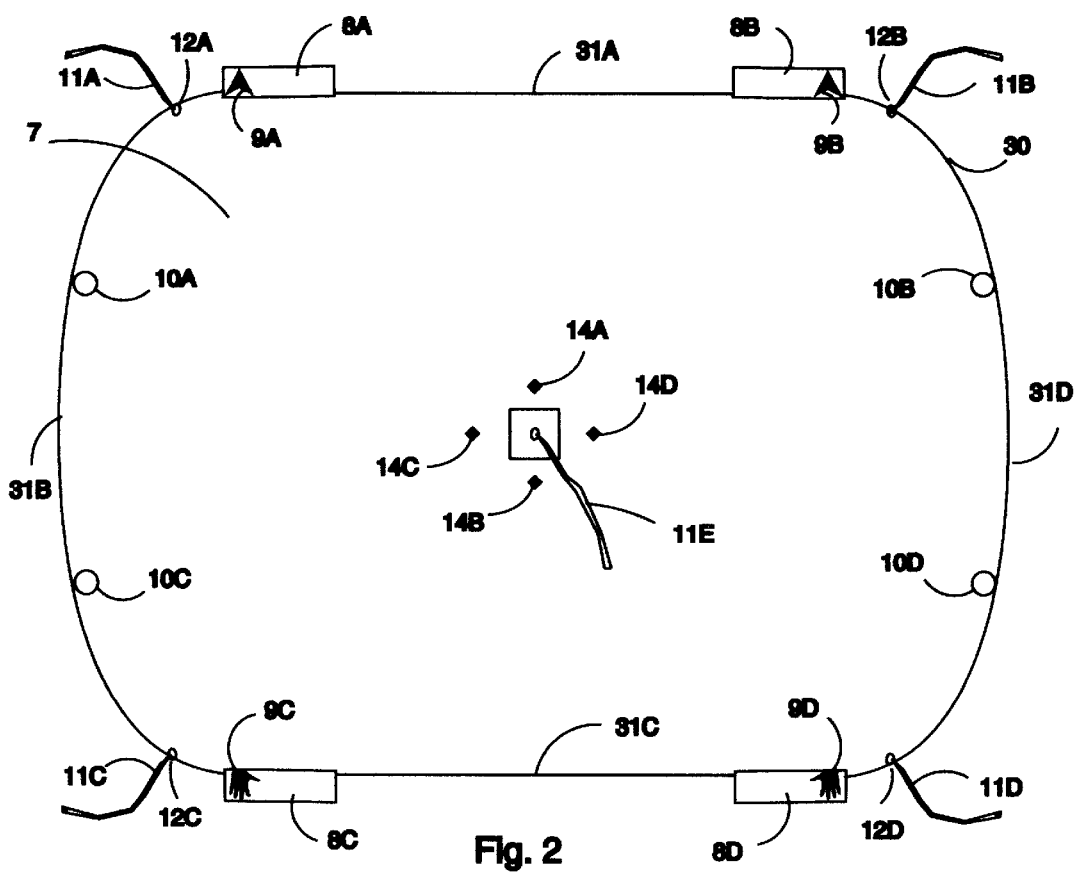
FIG. 2 is a top plan view of the cover.

FIG. 1 shows a vehicle 21 being covered in less than three seconds, in accordance with the invention. Weights 8A and 8B, attached to cover 7, were just thrown across the vehicle by driver 20, instantly covering it. Driver 20 is holding weights 8C and also 8D (not seen in FIG. 1) Specific choices of design and material are necessary to for cover 7 to deploy quickly and easily. Cover 7 is cut from a lightweight, fabric, such as polyester. The lightest fabric that is adequately durable is the best choice to make the cover easiest to throw, to keep the propelling weights as light as possible, and to have the least amount of bulk, for ease of general handling, for winding around the weights and for compact storage. The fabric may be coated with alumina polyurethane for high reflectivity of ultraviolet (UV) and ? (IR) heat radiation from the sun. Reflecting heat to keep the vehicle interior cool is a major feature of cover 7, since it is convenient enough to be used by people during the course of their daily driving activities. A water repellant coating also helps shed rain and ice. Panels are sewn together to fit the general contour of the roof and windows of a typical sedan. Reference will be made to FIG. 2, which shows a top plan view of cover 7. Perimeter 30 describes an approximate rectangle with rounded corners or ends.

Ballistic Weights—Discussion

Weights 8A–D are the heart of the cover. Weights 8A–D are designed to have numerous essential qualities, several of which are conflicting. For instance, they must be rigid enough to efficiently receive kinetic energy from a rapid thrust, such that the lightest possible weight can carry cover 7 over vehicle 21. They also must be rigid enough to maintain a flat profile that allows four weights 8A–D to be stacked together, forming a spindle that can be held with one hand to wind cover 7 around for storage. In opposition to rigidity, they must be absolutely safe—they must be soft, pliable, resilient, and dead,in order to absorb energy upon impact, to prevent damage and loud impact noise, which gives a strong negative perception of potential damage.

A simple sandbag, packed tight enough to efficiently receive adequate thrust energy, impacts with the potential for damage and a very disturbing sound. If the sandbag is packed loosely, the potential for damage and noise is reduced, however it is less effective at carrying cover 7 across, because it is too dead, it flexes too much, draining thrust energy, and the cover plops on the roof. If more sand is added to compensate, the weights become too heavy for most people to throw, and, again, the cover plops on the roof. Sand, repeatedly impacted against most flexible materials, will eventually cut through the material. Sand will eventually leak out of a bag after repeated impacts. Leaking sand is highly abrasive and highly destructive to a car finish. In any case, it is virtually impossible to stack four sandbags, of adequate weight to carry the cover across a vehicle, or stack together to form a spindle, or to hold them in one hand, so the cover can be wound around them for storage.

A weight constructed with a water bottle has numerous other problems. For instance, it turns into a brick when the water freezes, damaging both the vehicle and the bottle. When liquid, the impact noise sounds like a minor car wreck. Water. will evaporate or leak. Finally, water is not nearly heavy enough to conform to the necessary size constraints. Metal, rubber or solid plastic weights are impractical and too expensive.

Ballistic Weights—Design

Figure 3A:
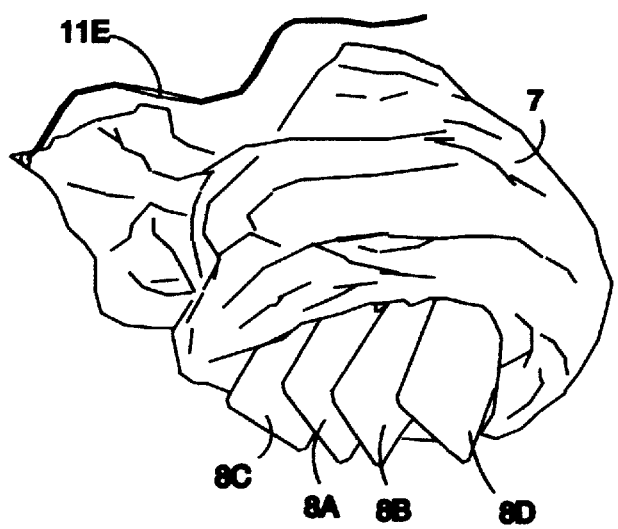
FIG. 3A is a perspective view showing the cover rolled around the weights for stowage.
Figure 3B:
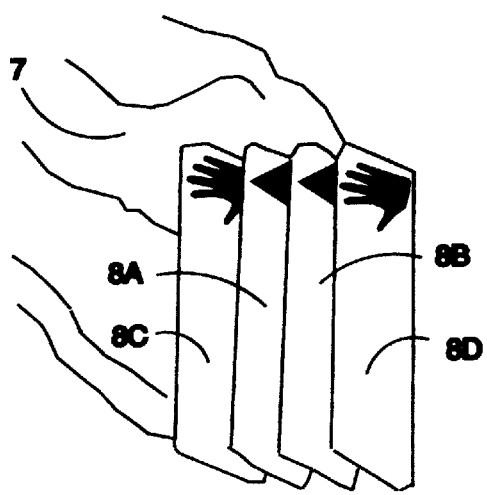
FIG. 3B depicts the weights in stowage position.
Figure 3C:
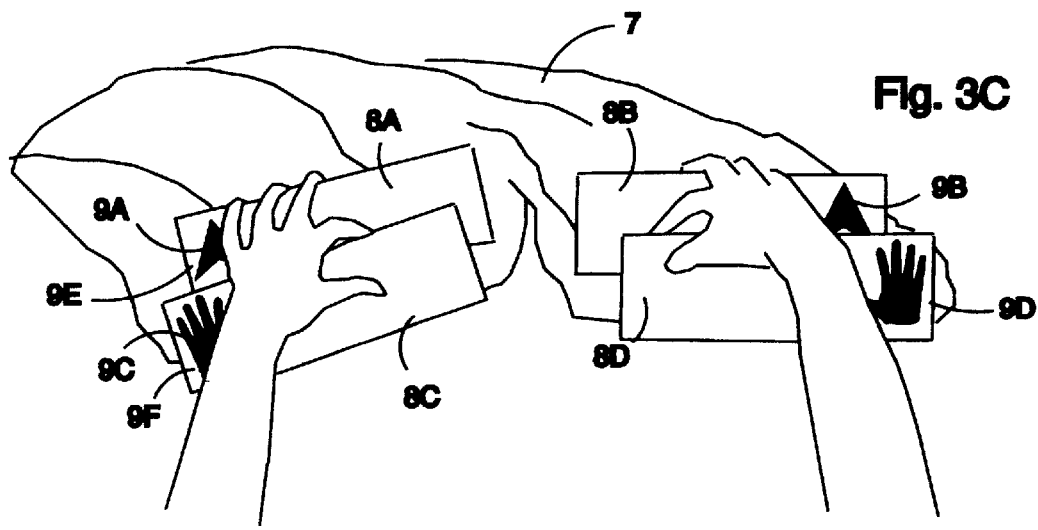
FIG. 3C depicts the weights held in position prior to throwing or stowage.
Figure 3D:
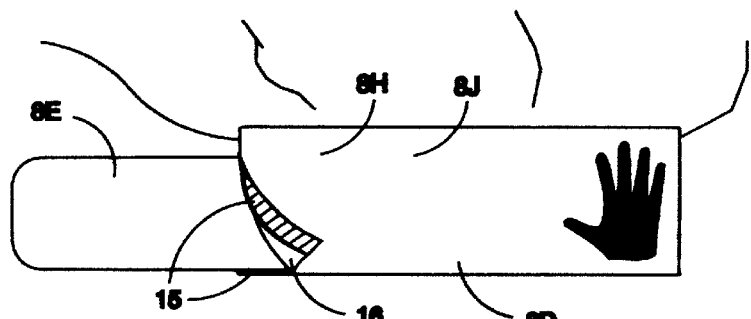
FIG. 3D is a top plan view showing the removable ballast container partially in the weight pouch.
Figure 3G:
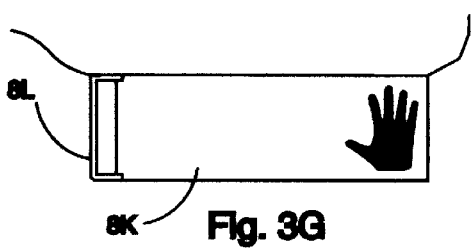
FIG. 3G is a top plan view showing an alternative weight for a very large cover.
Figure 3E:
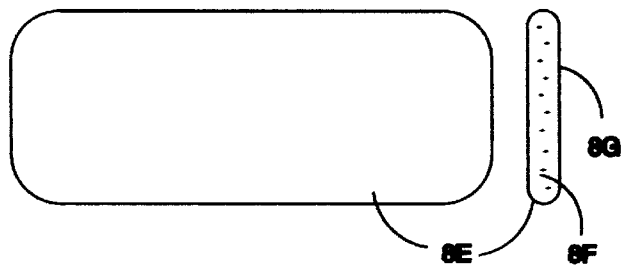
FIG. 3E is a front view showing the ballast container and a sectional view thereof.

The composite design of weights 8A–D give them all of the necessary desirable, yet conflicting, qualities. In addition to absorbing thrust and impact energy, a specific shape must be restored after temporarily deforming during impact, a necessary degree of rigidity, resilience, softness and deadness must be maintained, and they must have relative stability over a wide range of temperatures. With reference to FIGS. 3D–E, weight 8D comprises a rectangular reinforced-vinyl pouch 8J affixed to perimeter 30 of cover 7, such as by sewing, a thin layer of polyethylene foam padding 16, hook and loop closure 15, low density polyethylene ballast container 8E and ballast 8F.

Ballast Container and Ballast

The heart of weights 8A–D is low-density polyethylene blow-mold ballast container 8E shown in FIG. 3E. It is 8.5" long, 3.125" wide and 0.675" thick. The corners are heavily radiused, to distribute a corner impact over the greatest possible.area. For resiliency, the container wall 8G is 0.02" thick on the radii varying to 0.06" in the middle of the largest flat surface for more rigidity. Low density polyethylene, is used for ballast container 8E because it is the most resilient polyethylene and does not become brittle, even at low temperatures. Upon impact it easily distorts to absorb energy and it quickly returns to its normal shape. It is tough and will withstand the abuse of being closed in a door frame.

Ballast container 8E is filled to 97% capacity with clean sand ballast 8F and weighs about 410 grams. Sand 8F becomes loose and evenly distributed when deployed so container 8E can deform upon impact. With room to move within container 8E, sand 8F explodes into chaotic random motion upon impact, absorbing energy to protect vehicle 21, reduce impact noise and deaden any tendency for the weight to bounce.

Filled ballast container 8E, by itself, will not damage a vehicle, even if thrown quite hard. However, since it distorts minimally with a rapid acceleration thrust and the sand is packed at the bottom due to gravity, kinetic energy is efficiently transferred to the weight, making it easy to throw and as light-weight and easy to handle as possible. In other words, the most cover carrying ability is accomplished with the least amount of weight and throwing energy required. Sand 8F does not abrade the inside surface of container 8E. Sand 8F cannot leak out, even after regular use over a long period of time. The flat shape and thinness of ballast container 8E is specifically chosen to make it easy to stack four weights 8A–D and hold them firmly together with one hand so that cover 7 can be wound around them for storage.

Weight—Complete Unit

Ballast container 8E is inserted in pouch 8J, as shown in FIG. 3D. Pouch 8J is sewn together with an outer layer 8H of reinforced vinyl such as naugahyde, which provides friction between the weight and the surface of the vehicle for additional anchoring of the cover. The vinyl also provides nominal padding and sound deadening. Inner layer 16 of 0.0625 thick polyethylene foam padding reduces impact noise and provides additional safety against impact damage. Hook and loop closure 15 secures ballast container 8E inside pouch 8J and enables easy removal for machine washing.

As depicted in FIG. 2, weights 8A and 8B are attached in a parallel position to long side 31A. The centers of weights 8A and 8B are located approximately 30" from the lateral centerline on both sides. Weights 8C and 8D are symmetrically located on long side 31 C. The position of weights 8A–D is optimal for deploying cover 7 over vehicle 21 and it enables them to be locked inside the vehicle doors for security.

The weights are lightweight and easy to handle yet, they are rigid enough to efficiently receive kinetic energy from a rapid thrust to successfully carry cover 7 over vehicle 21. They also are rigid enough to maintain a flat profile that allows four weights to be stacked together forming a spindle that can be easily held with one hand to wind the cover around for storage. They also are soft and pliable. They absorb energy upon impact thus preventing damage. They subdue disturbing impact noise, eliminating a negative perception. The weights act like an invisible helper on the other side of the vehicle, pulling the cover so a seesaw motion may be used to guide the cover into perfect position. They are safe to the vehicle in every way.

Color-Coded Hand and Jet Symbols on the Weights

Color-coded hand and jet symbols on the weights direct the user to hold and throw the proper weights. Remember the three Rs—Red to the Right to the Rear. With reference to FIG. 3C, weight 8A has a blue jet symbol 9A on its outside end. Weight 8B has a red jet symbol 9B on its outside end. Weight 8C has a blue hand symbol 9C on its outside end. Weight 8D has a red hand symbol 9D on its outside end. All symbols are on both sides of the weights. Weights with red symbols are held with the right hand towards the rear of the vehicle. Thus, the three Rs —Red to the Right to the Rear. Weights with blue symbols are held with the left hand. Weights with jet symbols are thrown across the vehicle while the weights with hand symbols are held. The symbols are showing what action is to be taken, making it very easy to deploy cover 7 or to ready a tangled cover.

Additional Securing Devices

Figure 4:
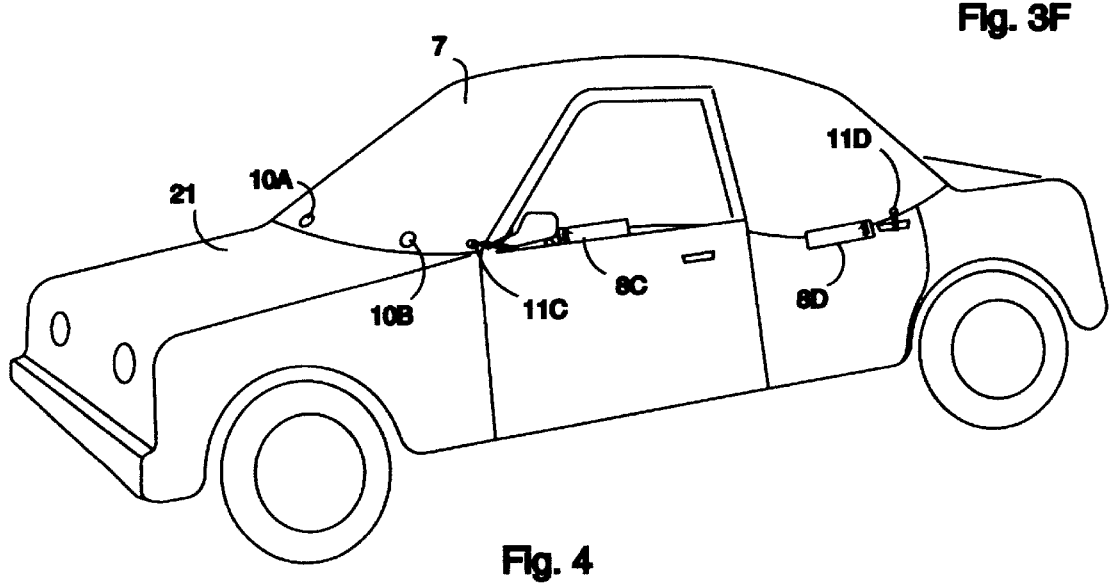
FIG. 4 is a perspective view showing the cover in place on a vehicle with a door closed, securing the cover.

FIG. 2 shows optional additional devices hold cover 7 in place when needed, such as when it is windy. Suction cups 10A and 10C are fastened near the perimeter of the cover on short side 31B approximately 18" from the longitudinal centerline on both sides. Suction cups 10B and 10D are symmetrically located on short side 31D. Suction cups 10A–D are used to attach cover 7 to the front and rear windshields, as depicted in FIG. 4. In FIG. 2, hook and loop straps 11A, 11B, 11C and 11D are attached to grommets 12A, 12B, 12C, and 12D near the perimeter of cover 7 on the rounded corners approximately 6" to 12" from the nearest weight. Straps 11A–D can be fastened around exterior mirrors and door handles, as depicted in FIG. 4. Any grommet 12A–D can be used to attach an elastic cord to cover 7.

Self-Closing Wind Vents

Figure 3F:
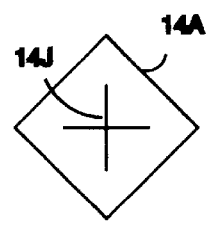
FIG. 3F is a top plan view showing an automatically self-closing wind vent.

FIG. 2 shows self-closing wind vents 14A—H to relieve trapped air under cover 7, especially when cover 7 is wound around weights 8A–D, and cover 7 tends to balloon. Vents 14A–D are normally closed providing full protection, but open with a slight air pressure. With reference to FIG. 3F, vent 14A comprises an optional two inch square sheet of a reinforcing material diagonally attached to cover 7 and two 1-¼" long slits 14J cut in the center, forming a cross. Since the fabric has a tendency to lay flat, vents 14A–D normally stay closed. However, due to the design of the slits, a slight air pressure opens the slits and air is released. In FIG. 2, vents 14A and 14B are located on the lateral centerline 4" from the longitudinal centerline on both sides. Vents 14C and 14D are located on the longitudinal centerline 4" from the lateral centerline on both sides.

Storage Strap

Hook and loop strap 11E is attached to the center of cover 7. Cover 7 is rolled around weights 8A–D for storage as depicted in FIG. 3A. Strap 11E is tightened around rolled cover 7, holding it as a tight bundle.

Preferred Embodiment—Operation

Deployment or removal and storage of the cover are unexpectedly quick and easy. After a few tries the average person can perform either operation in a few seconds. Should the cover become tangled, it can be re-oriented in less than ten seconds. This is the first cover that is convenient enough for everyday use, when it might need to be deployed and stored quickly, numerous times per day.

Deployment

FIG. 3A shows cover 7, wound around weights 8A–D for stowage. Cover 7 can be removed from the trunk of a car in this stored position, and put in place over the vehicle in less than 8 seconds. First, strap 11E is pulled until the cover is unwound, revealing weights 8A–D and action symbols 9A–D, as shown in FIG. 3B. Weights 8A–D are grasped so that they are split into two pairs, end to end, with the red symbols to the right towards the rear of the vehicle—the three Rs—Red to the Right to the Rear, as shown in FIG. 3C. Weights 8C and 8D, with hand symbols 9C and D, are held with the thumbs and index fingers Weights 8A and 8B, with jet symbols 9A and B, are held with the remaining fingers and, with reference to FIG. 1, are thrown rapidly over vehicle 21 by driver 20. Weight 8A is thrown 45 degrees to the driver's left. Weight 8B is thrown 45 degrees to the driver's right. This is a natural motion. When weights 8A and 8B land, weights 8C and 8D are pulled outward from each other and down to the bottoms of the windows. If cover 7 is not exactly straight, the weights can be seesawed with the opposite weights, which act like an invisible helper pulling on the other side of the car, to guide the cover into perfect position. Typically, cover 7 is removed from the trunk and the trunk lid and driver's door is left open during deployment. When the door is closed and locked, cover 7 is automatically locked to vehicle 21. The trunk is closed on the rearmost portion of cover 7, holding it down in the wind.

Storage

The procedure for storage is very simple. It is the reverse of the procedure for deployment. Weights 8C and 8D are taken between the thumbs and index fingers. Driver 20 takes a step backwards, pulling the "jet" weights 8A and 8B onto the top of vehicle 21. Weights 8 and 8B are pulled closer by pulling the cover fabric. Weight s 8A and 8B are picked up with the remaining fingers. The weights should now be oriented as depicted in FIG. 3C. Weights 8A and 8C are together on the left, and weights 8B and 8D are together on the right. The markings are on the outside ends. Weights 8A–D are now folded together, with the markings all at the same end as depicted in FIG. 3B. Weights 8A–D are held together with one hand so that the cover fabric drapes. The fabric is grasped with the other hand about three feet from weights 8A–D. Cover 7 is then wound around weights 8A–D, holding them in position for the next deployment. Cover 7 may balloon while winding, but vents 14A–D allow trapped air to escape. Hook and loop strap 11E secures the stored cover 7.

Securing the Cover

If there is no wind and theft is not a concern, the cover is automatically secured when it is deployed. Weights 8A–D will hold the cover in place in a light breeze. Gravity and the rubbery surface of the weights help keep them in place. Vent holes 14A–D as depicted in FIG. 2 allows wind pressure trapped under the cover to be released.

Stronger wind can lift the ends of cover 7 off the windshield and rear window. One or more of the suction cups 10A–D may be stuck to the window glass to secure the ends. One or more weights may be closed in a door to prevent theft and to hold the cover in strong winds. FIG. 4 depicts vehicle 21 with optional hook and loop strap 11C attached to a rear-view mirror and hook and loop strap 11D attached to a door handle. Suction cups 10A and 10C are attached to the windshield. Weight 8C is locked inside the driver's door. In normal use, one weight is locked in the driver's door and the trunk is closed on a rear portion. If it is very windy, another weight is closed in the right front door. The straps and suction cups are not necessary.

Re-Orienting a Tangled Cover

A tangled cover can be oriented in a few seconds by arranging the weights. The only rule is the three Rs—Red to the Right to the Rear. Simply grasp the weights as one would prior to deployment and the cover is ready.

Other Embodiments

Full Vehicle Cover—Description

Figure 5A:
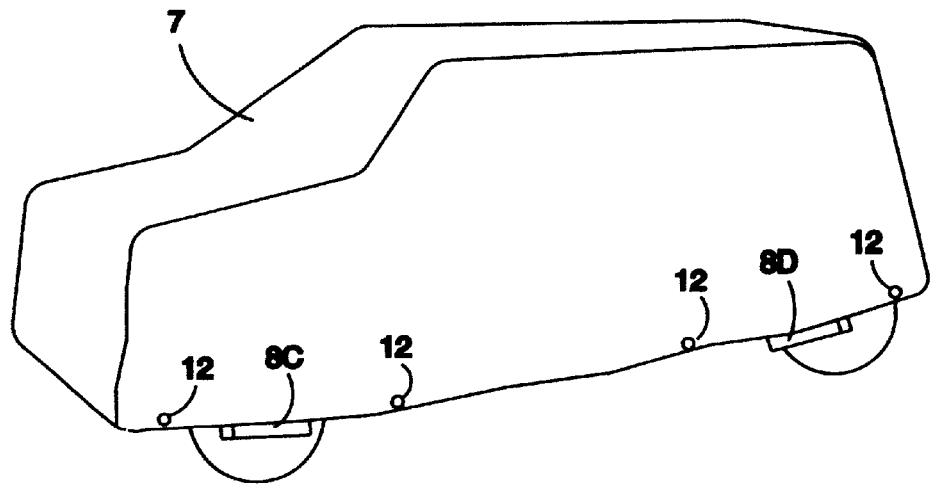
FIG. 5A is a perspective view showing a full vehicle cover.

This embodiment of the invention covers the entire top and sides of the vehicle. Reference is made to FIG. 5A. Panels of material are sewn together to form cover 7, to approximately conform to the shape of the entire vehicle. Additionally, grommets 12 are provided for attaching cover 7 to the vehicle. Weights 8C and 8D are attached to the perimeter, as previously described.

Full Vehicle Cover—Operation

Operation of cover 7 is the same as previously described, except that 1) cover 7 may be secured using grommets 12, and 2) suction cups are not provided, and 3) it may not be possible to close the weights into the doors.

Airplane Cabin Cover—Description

Figure 5B:
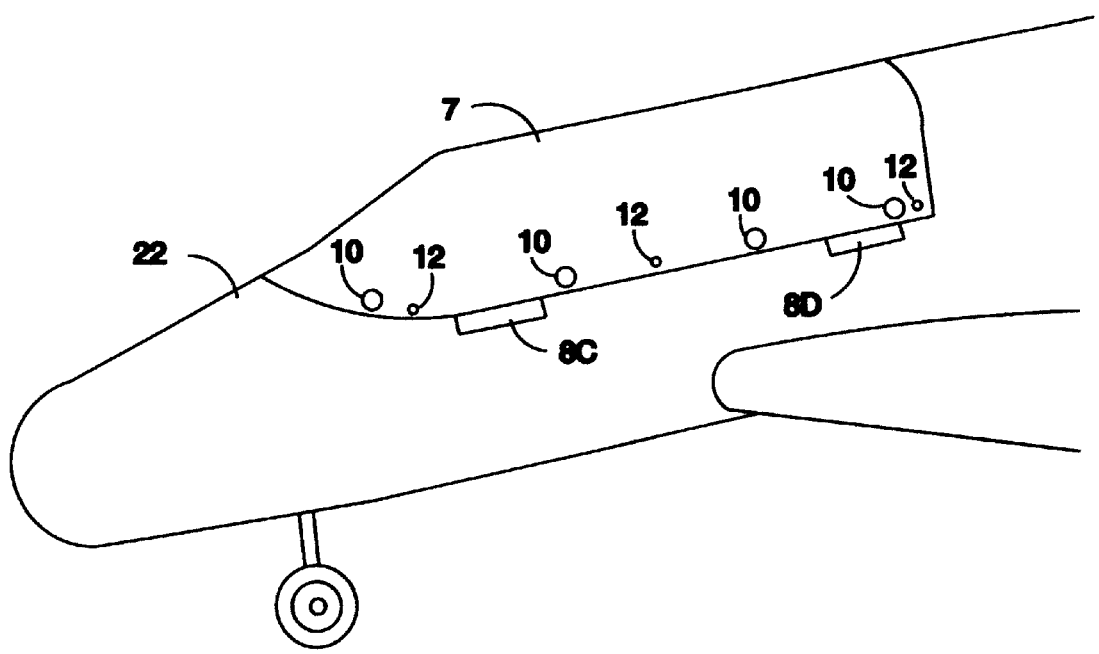
FIG. 5B is a perspective view showing an airplane cabin cover.

This embodiment conforms to the approximate contours of the cabin of single and multiengine aircraft 22 to protect expensive avionics from the excessive heat of the greenhouse effect (FIG. 5B). Additional suction cups 10 and grommets 12 are provided for securing the cover 7. Weights 8C and 8D are attached as previously described.

Airplane Cabin Cover—Operation

Operation of this embodiment is the same except that cover 7 can be additionally secured with suction cups 10 and with grommets 12 in conjunction with elastic cords or straps (not shown). It may not be possible to close weights 8A–D in vehicle doors.

Large Vehicle Cover—Description

Figure 5C:
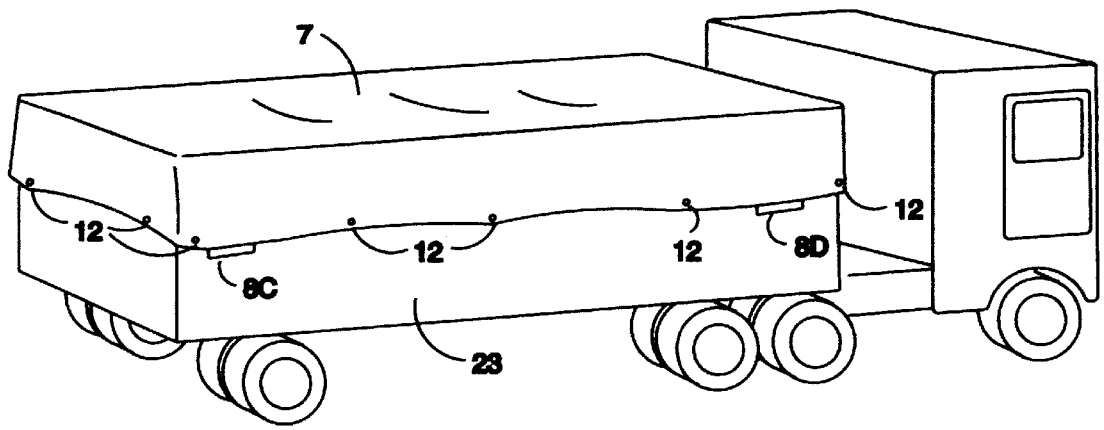
FIG. 5C is a perspective view showing a large vehicle cover.

Many states require that tractor-trailers carrying debris must be covered. Covering a tractor-trailer or a motor home is exhausting and time consuming. This embodiment makes the task simple and quick. With reference to FIG. 5C, this embodiment is similar to those previously described except that 1) cover 7 is a rectangular shape slightly larger than the top of trailer 23, 2) additional grommets 12 are provided for securing the cover in conjunction with elastic cords or straps (not shown), 3) weights 8A–D are larger, or large cover weights 8G are used, weighing 2–5 pounds each and are located approximately three feet from the corners, and 4) suction cups and hook and loop straps are not provided.

Large Vehicle Cover—Operation

Deployment of this embodiment is the same as previously described, except the driver turns his or her back to the vehicle to throw the weights. Weights 8A–D are held behind with fully extended arms, then they are rapidly swung in an arc forward, up, and then over the back and released, easily carrying cover 7 over a fourteen-foot high, twelve foot wide vehicle. With this embodiment, cover 7 is secured using grommets 12 in conjunction with elastic cords, straps or rope (not shown).

Ballast container 8E in weights 8A and B on the far side of a large vehicle 23 or other large object are removed from weight pouch 8J prior to removing cover 7. With reference to FIG. 3D, hook and loop fastener 15 at the end of the weights is separated, and polyethylene ballast container 8E is slid out. Cover 7 can now be removed without pulling the ballast up the far side of the object that is covered. After cover 7 is removed, ballast containers 8E are inserted back into weight pouches 8J and secured with hook and loop fastener 15. Weights 8A–D are stacked together, but if they are too large to hold, they are put on the ground and the cover is wound around them similar to rolling up a sleeping bag.

General Purpose Covers—Description

Figure 5D:
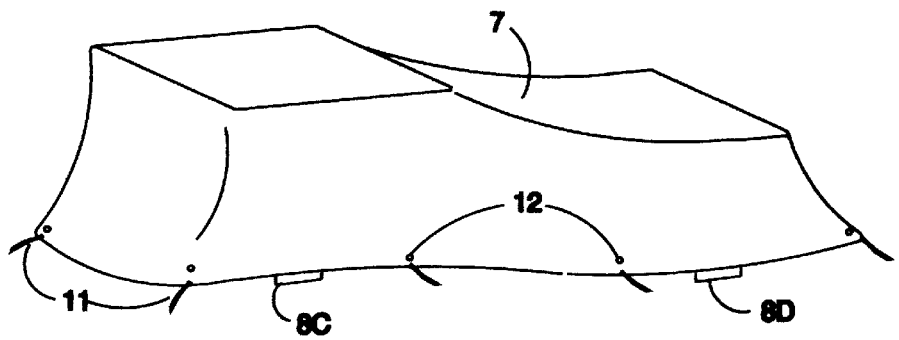
FIG. 5D is a perspective view showing a rectangular general-purpose cover.
Figure 5E:
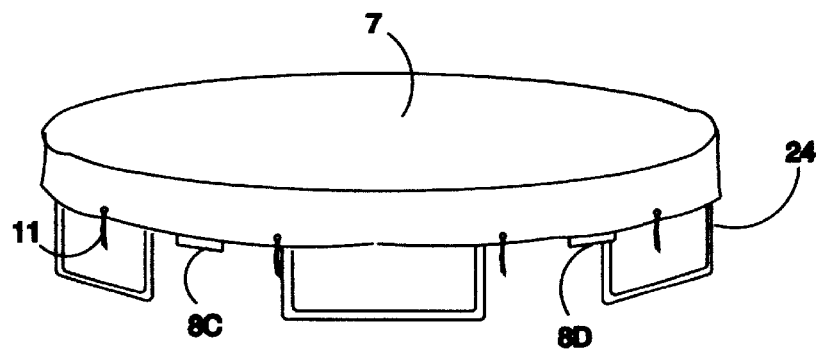
FIG. 5E is a perspective view showing a round cover on a trampoline.

These embodiments differ from the preferred embodiment in the sizes, shapes and provisions for securing. FIG. 5D depicts a rectangular cover 7 in place over various objects. FIG. 5E depicts a round cover 7 over a 14" trampoline 24. Each cover 7 has grommets 12, hook and loop straps 11 for securing and weights 8C and D shown with weights 8 A and B on the opposite side (not shown).

General Purpose Covers—Operation

These embodiments provide a means to quickly and easily protect large and bulky objects. Operation of these embodiments is the same except for the method of securing. Hook and loop straps are provided for securing. Additionally, grommets are provided for securing in conjunction with elastic cords, or rope. Large covers may be deployed and stored in a manner similar to the method used for large vehicles.

Large Cover Weights—Description

This embodiment (FIG. 3G) provides an alternate weight 8K for very large covers. With this embodiment, the design is virtually identical to the normal weights, except the size is scaled up, weighing 2–5 pounds. A handle 8L, is provided at the hook and loop opening.

Large Cover Weights—Operation

The operation is the same as covering a large vehicle, except that the handles make the heavier weights easier to throw and lengthens the thrust arc, imparting more kinetic energy to the weights.

Conclusions, Ramifications, and Scope

Accordingly, it can be seen that deployment or removal and storage of the cover comprise new methods that are surprisingly quick and easy. The weights are lightweight and easy to handle yet effective, safe and quiet. The cover can be deployed and stored with a speed and ease that is a significant improvement over prior art covers.

Although the descriptions above contain many specificities, these should not be construed as limiting the scope of the invention but as merely providing illustrations of some of the presently preferred embodiments of this invention. Various other embodiments and ramifications are possible within its scope. For example, different purposes for the cover, different shapes, positions, different construction of the weights, different materials and fabrics, various arrangements of means to secure the covers, and various means of projecting the weights are all within the scope of the invention. Thus the scope of the invention should be determined by the appended claims and their legal equivalents, rather than by the examples given.

I claim:

1. A ballistically deployable cover for a vehicle comprising a generally rectangular shaped light weight fabric, having a plurality of weights affixed thereto, generally evenly spaced along the perimeter of the fabric, each of said weights comprising an outer pouch, a layer of foam padding within said pouch, a ballast container within said padding, and ballast material within said ballast container.

2. The cover of claim 1 further comprising hook and loop fasteners to close said pouch.

3. The cover of claim 1 in which said ballast comprises loosely packed sand.

4. The cover of claim 1 in which said pouch is composed of vinyl.

5. The cover of claim 1 further comprising a plurality of suction cups affixed to the cover.

6. The cover of claim 1 further comprising a plurality of grommets affixed to the cover.

7. The cover of claim 1 further comprising a plurality of self-closing vents in said cover.

8. The cover of claim 1 in which said cover is composed of light weight polyester.

9. The cover of claim 1 in which the cover is coated with aluminized polyurethane.

10. The cover of claim 1 in which the cover is coated with a water repellant coating.

11. The cover of claim 1 in which the weights are coded to aid in the ballistic deployment of the cover.

12. The cover of claim 1 in which the cover is generally shaped to the-shape of the object to be covered.

13. The cover of claim 1 further comprising a storage strap affixed to the cover.

14. The cover of claim 1 in which the ballast containers have radiused corners.

15. The cover of claim 1 in which there are four weights evenly spaced along the perimeter of the fabric.

16. The cover of claim 15 in which two weights are coded for projection and two weights are coded for being held.

17. The cover of claim 1 in which the weights are generally rectangular shaped and adapted to be stacked together and held in one hand for wrapping the cover around the stacked weights, for stowage of the cover.

18. The cover of claim 1 in which each weight has a handle affixed thereto.

* * * * *